March 27, 1928.
G. M. HOLLENBACK
STERILIZER
Filed June 1, 1925
1,663,841
3 Sheets-Sheet 2
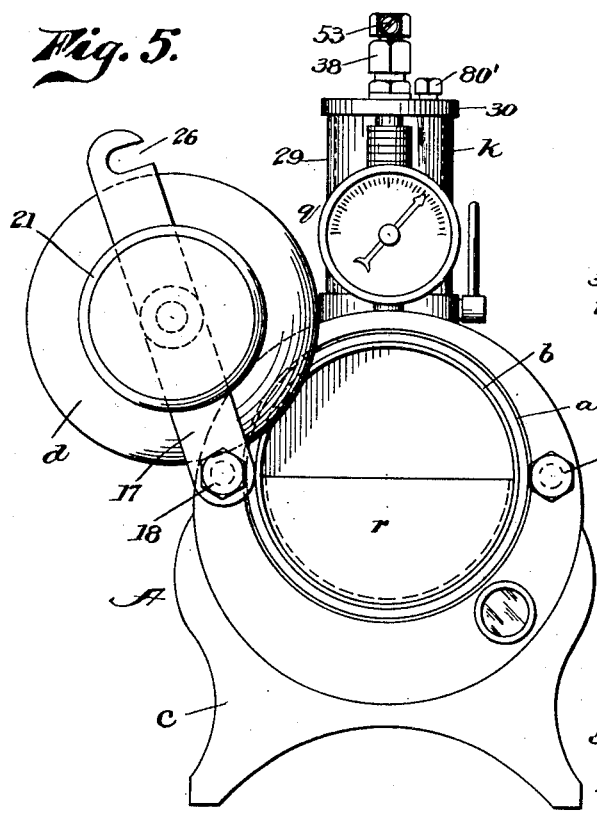
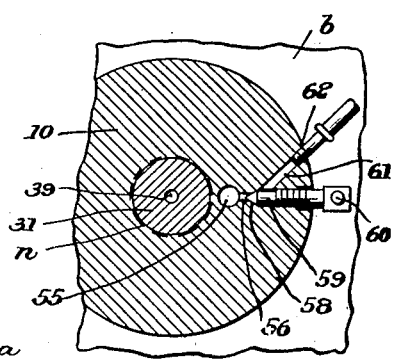
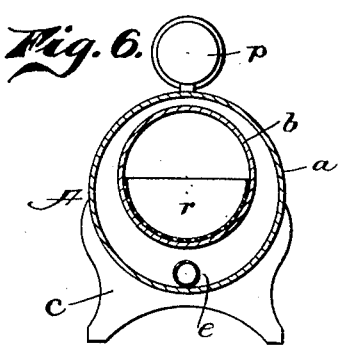
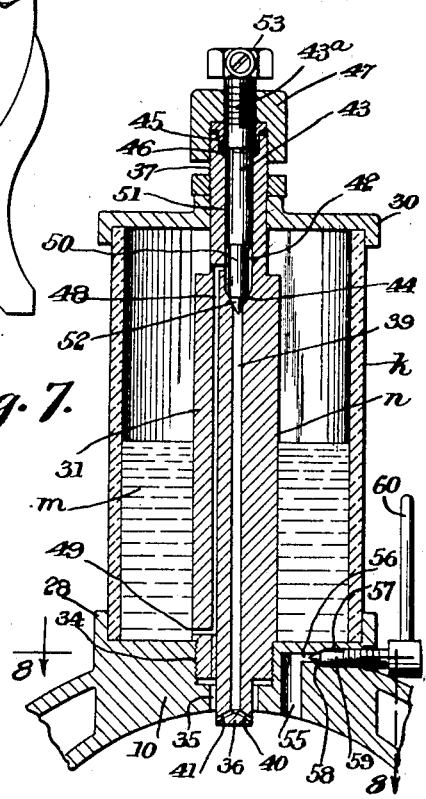
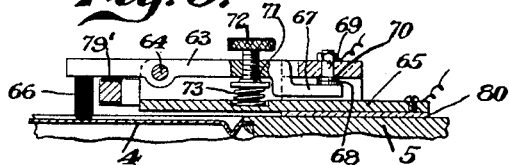
INVENTOR.
George M. Hollenback;
BY Blakeslee & Brown,
ATTORNEYS.

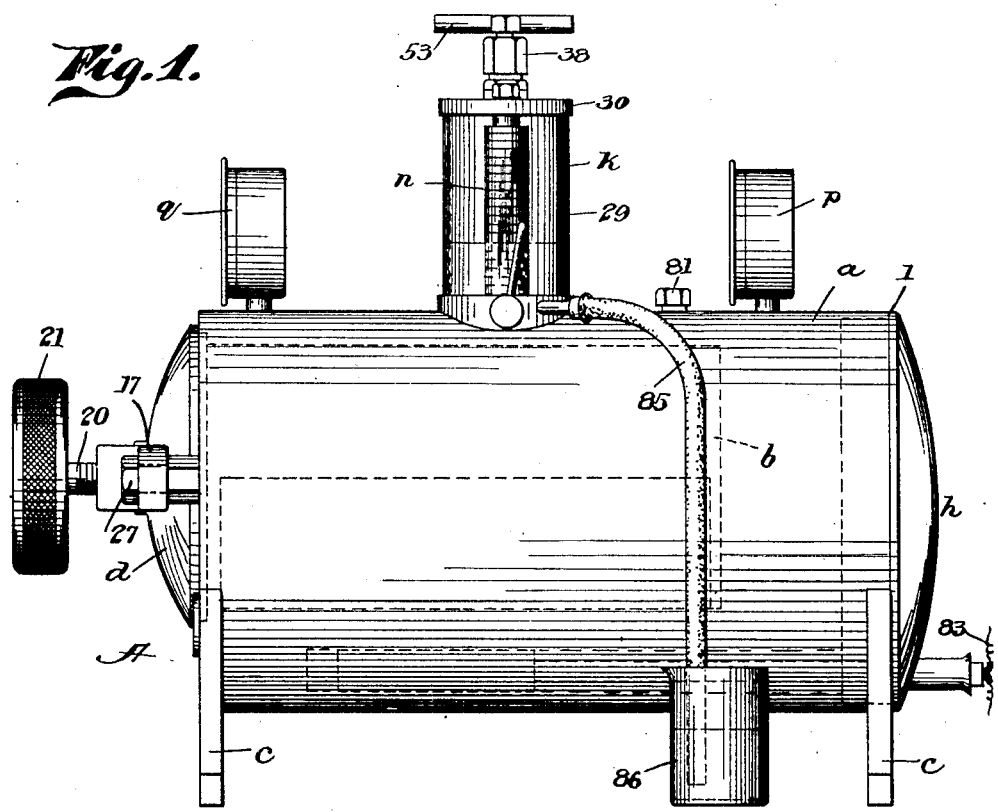
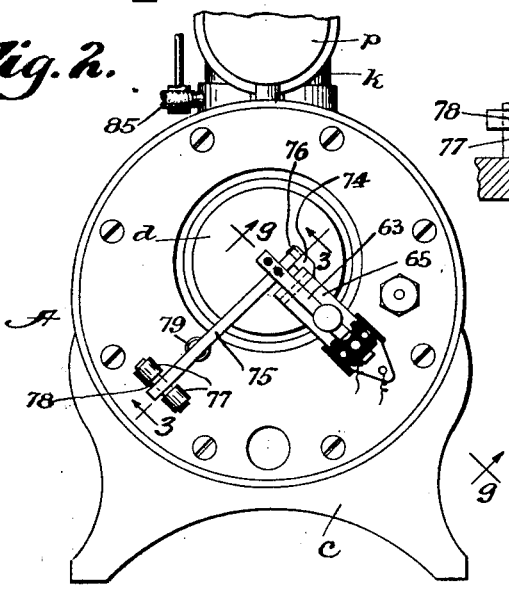
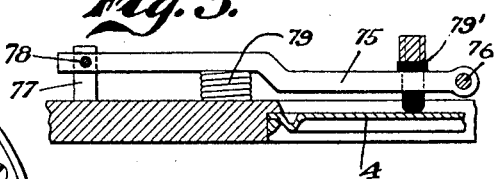
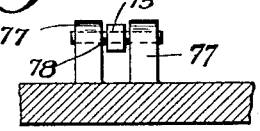

March 27, 1928.
G. M. HOLLENBACK
STERILIZER
Filed June 1, 1925
1,663,841
3 Sheets-Sheet 3
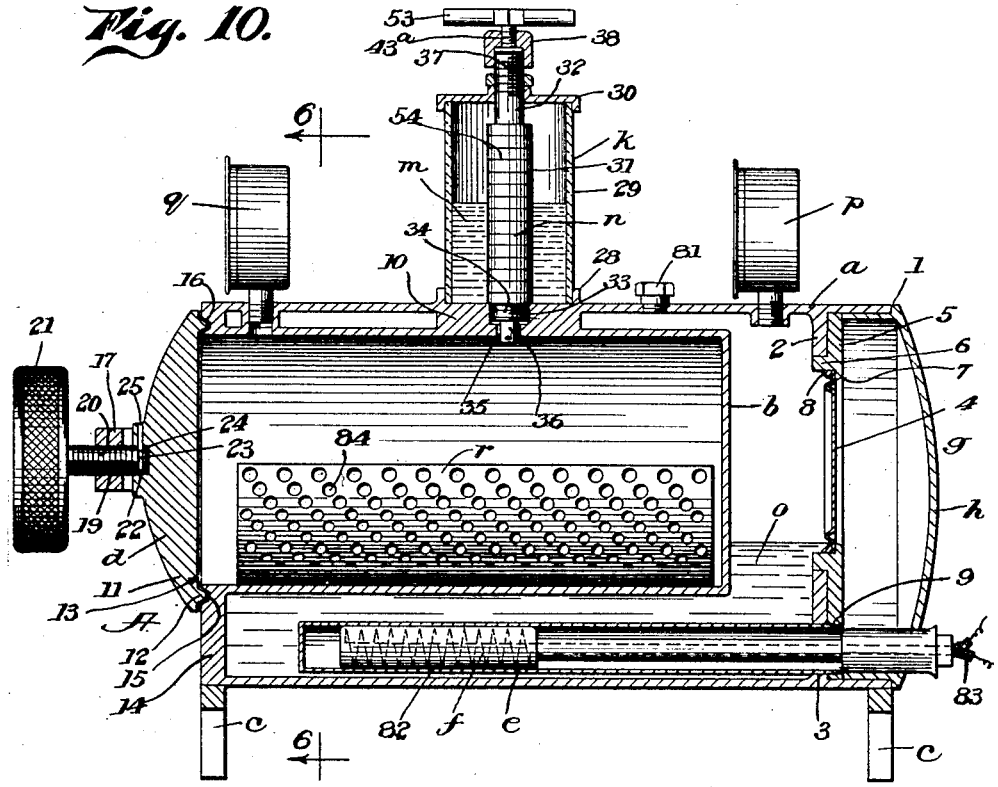
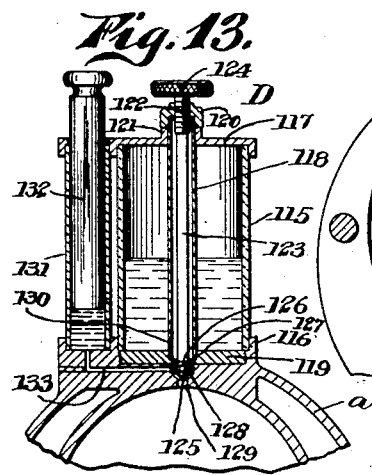
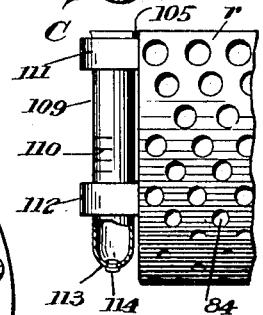
INVENTOR,
George M. Hollenback;
BY Blakeslee+Brown
ATTORNEYS.

Patented Mar. 27, 1928.

1,663,841

UNITED STATES PATENT OFFICE.

GEORGE M. HOLLENBACK, OF LOS ANGELES, CALIFORNIA, ASSIGNOR OF ONE-HALF TO DAVID W. McLEAN, OF LOS ANGELES, CALIFORNIA.

STERILIZER.

Application filed June 1, 1925. Serial No. 34,025.

This invention relates to sterilizers such as may be used for the sterilization of surgical instruments of all kinds. The invention has for an object the provision of a sterilizer which is compact in form, readily accessible, will sterilize instruments quickly and efficiently and thoroughly, and which can be regulated to give any degree of pressure desired within the sterilizer chamber.

A further object is the provision of a sterilizer which is so arranged as to be automatic in its action so that the sterilizer cannot be damaged by overheating.

The invention has for further objects the provision of an improved sterilizer which will be superior in point of relative simplicity and inexpensiveness, taken in conjunction with utility, durability and general efficiency and serviceability.

With the above mentioned and other objects in view, the invention consists in the novel and useful provision, formation, construction, association and relative arrangement of parts, members and features, all as shown in certain of its embodiments in the accompanying drawings, described generally and more particularly pointed out in claims.

In the drawings:

Figure 1 is a side elevation of the improved sterilizer;

Figure 2 is a fragmentary end view of the sterilizer with a cap member removed;

Figure 3 is a fragmentary partially sectional view on an enlarged scale from the showing of Figure 2 and taken on the line 3—3 of Figure 2;

Figure 4 is a fragmentary partly sectional view of certain features of the device shown in Figure 3;

Figure 5 is an end elevation of the sterilizer shown in Figure 1, the cover being revolved from closed position so that access to the sterilizer chamber may be had;

Figure 6 is a cross sectional view on a reduced scale from the showing of Figure 10, and taken on the line 6—6 of Figure 10;

Figure 7 is a vertical sectional view on an enlarged scale of the sterilizer fluid container and valve operating means;

Figure 8 is a fragmentary cross sectional view on the line 8—8 of Figure 7;

Figure 9 is a fragmentary cross sectional view on an enlarged scale from the showing of Figure 2 and taken on the line 9—9 of Figure 2;

Figure 10 is a longitudinal sectional view of the sterilizer; and,

Figures 11, 12 and 13 are fragmentary views illustrating different methods of injecting a charge of sterilizing fluid within the sterilizer chamber.

Corresponding parts in all the figures are designated by the same reference characters.

Referring with particularity to the drawings, the improved sterilizer shown in Figures 1 to 10 is designated as an entirety and in the embodiment shown, by A. Said sterilizer A includes a casing $a$, within which and spaced from the inner surface of the casing wall is a sterilizing chamber member $b$. Said casing $a$ may be suitably supported by means of brackets or legs $c$ located adjacent the ends of such casing $a$ and such casing $a$ is provided inwardly from an end 1 with an annular flange 2. The opposite end of such casing is adapted to carry a closure means $d$ for closing an end of the sterilizing chamber member $b$, it being noted that the interior of the sterilizing chamber member has no communication with the interior of the casing $a$. Likewise within the casing $a$ and spaced from the inner surface wall thereof, as well as spaced from the sterilizing chamber member is an elongated casing $e$, and the annular flange 2 is transversely bored so that the said casing $e$ may be passed therethrough, as shown at 3. The casing $e$ is adapted to have contained therein a heating member $f$. The opening in the annular flange 2 is eccentric to the periphery of the casing $a$, and such annular flange is adapted to receive within said opening a metal diaphragm member 4 constituting a part of pressure and temperature control means $g$. This diaphragm 4 is suitably carried by an annular member 5 provided with a flange 6 bounding the opening, which flange is adapted to be received within the opening of the annular flange 2. In this regard it will be noted that the central opening of the annular member 5 is eccentric to the circumferential surface of such member 5. Said member 5 is provided with an annular lip or flange 7 extending into the annular opening, and associated with the flange 6 and likewise extending into the annular opening is a member 8 and between the member 8 and such flange or lip 7 is confined in part the diaphragm 4. The member 5 is provided with a screw-threaded bore 9 adapted to be in alignment with the transverse bore 3 of the flange 2, and an end of the casing *e* is screw-threaded so as to have screw-threaded engagement with the threads 9. A cap *h* is adapted to enclose the diaphragm 4 at the end 1, and such cap is formed with an annular flange fitting within the casing *a* and bearing against the surface of the annular member 5. The casing *a* and the sterilizing chamber member may be integrally formed or may be separate castings. In the showing, however, the two chamber members are cast together being held together by a bridging portion 10 located somewhat centrally of the sterilizing chamber member *b* and likewise joined at the portion of the casing adjacent the closure *d*.

The closure means *d* may comprise a cap 11 formed with an annular flange 12 projecting outwardly from the face 13 of such cap and the end 14 of the casing *a* is provided with an annular groove 15 within which is received a gasket 16 and against such gasket the flange 12 is adapted to seat when the cap is closing entrance within the sterilizing chamber *b*. The closure means likewise includes an arm 17 hinged as at 18 to the casing *a* and which arm is centrally screw-threaded as shown at 19 for the reception of a screw 20 which carries a knob 21 at one end and has its opposite end connected with the cap 11, as shown at 22. In this connection the screw is grooved as shown at 23 and the cap is provided with a bore 24 adapted to receive an end of such screw, there being a pin 25 passed through the cap and received in the groove 23 so as to hold the cap and screw in working relation, and likewise so that the cap will not be rotated when the screw is rotated. The opposite end of the arm 17 is slotted as shown at 26, and the casing end 14 carries a projecting headed stud 27 the shank portion of which stud is adapted to be received within the slot 26 when the arm has been revolved from the position shown in Figure 5 to that shown in Fig. 1. A turning of the handle 21 will move the cap either toward the casing *a* or away from same. The casing *a* is provided with an annular flange 28 substantially in alignment with the bridging portion 10, and received within the confines of such annular flange is a reservoir designated generally by *k*, which reservoir is used for the holding of a sterilizing agent such as indicated in broken lines by *m*. The said reservoir includes a container shell 29 fitted within the flange 28 and provided with a cap 30 at its opposite end. Centrally disposed within the reservoir *k* is valve means *n* which includes an elongated casing 31 provided with a part 32 extending through the cap 30, and the bridging portion 10 is provided with a screw-threaded bore 33 adapted to receive a screw-threaded end portion of such valve casing 31, as shown at 34. The said portion 10 is likewise provided with a bore 35 the diameter of which is less than the diameter of the screw-threaded bore portion 33, and the casing 31 is provided with a part 36 extending through such bore and into the chamber portion of the sterilizing chamber *b*. The said valve casing 31 is screw-threaded as at 37, and a nut 38 is received upon such screw threads and bears against a portion of the cap 30 so that the valve casing is held tightly within such reservoir and likewise functions to hold the reservoir shell 29 tightly between the cap and within the annular flange 28 of the casing *a*. The casing 31 is provided with a longitudinal port 39, and with two branch ports 40 and 41 in the portion 36, communicating with such port 39. The port 39 is enlarged as to diameter at that portion of such casing shown at 42, and this portion of enlarged diameter is adapted to have confined therein a needle valve 43. There is a tapered seat 44 between the part 39 and the portion of enlarged diameter 42. The needle valve shank is screw-threaded as shown at 43ª, and likewise passed through a stuffing gland 45, it being noted that this particular casing is enlarged as to diameter at the portion 46 so as to receive a gasket, and a cap nut 47 is in screw-threaded engagement with the threads 43ª of the needle valve, and likewise such cap is in screw-threaded engagement with the threads 37 of the casing. There is a second port 48 in part passed longitudinally through the casing 31 and having communication with the enlarged portion 42 of the port 39 and likewise in communication at its lower extremity through the medium of a branch port with the interior of the reservoir, as shown at 49. In this particular it is to be noted that the shank of the needle valve at that portion where the port 48 communicates with the enlarged portion 42 of the port 39, is of lesser diameter as shown at 50 than a second portion 51 of the shank. Likewise the portion 50 of the needle valve shank is provided with a conical tip 52 adapted to seat upon the portion 44 under certain conditions. The needle valve is provided with a handle 53, so that the same may be rotated. The periphery of the valve casing 31 is provided with a series of spaced graduations 54 so that the level of any sterilizing agent *m* within the reservoir may be readily ascertained. A port 55 is passed through the part 10 and is in communication with the interior of the chamber *b*. A second port 56 is passed through the flange 28 (see Fig. 7), and is in communication with the port 55. This port 56 is enlarged as to diameter, as shown at 57 and the wall surrounding the port is provided with a tapered seat 58 and a needle valve 59 is received within the portion 57 and has a conical tip adapted to seat at times upon the seat 58. This needle valve is provided with a handle 60 and the shank of the needle valve is screw-threaded for screw-threaded engagement with screw threads in the wall surrounding the portion of enlarged diameter 57. A branch port 61 communicates with the portion of enlarged diameter 57. When the handle 60 is moved the needle valve will have moved so that the port 56 will communicate with the port 61 or communication between such ports is entirely shut off. A portion of the walls surround the port 61 is screw-threaded for the reception of a screw-threaded nipple 62.

Constituting a portion of the pressure and temperature control means $g$ is a lever 63 (see Fig. 9), hingedly carried as at 64 by a bracket 65 mounted upon the annulus 5. Said lever carries at one end thereof a depending member 66 adapted to contact with the center of the diaphragm 4, and the opposite end portion of said lever is bent first downwardly and then provided with a portion paralleling the main portion of the lever as shown at 67 and which portion 67 carries an electrical contact member 68. The bracket 65 is provided with an insulation plug 69, and passed through such insulation plug is a contact member 70 adapted to normally contact with the contact member 68. It is to be noted that the member 66 is at one side of the hinge portion of the lever, while means 71 is at the opposite side of the said hinge portion. Such means 71 includes a screw 72 provided with a fingerpiece passed through a transversely screw-threaded opening in the lever, and a coil spring 73 included between a portion of the bracket 65 and an end of such screw 72. The means 71 regulates the pressure of contact between the contacts 68 and 70, and movement of the diaphragm outwardly against the member 66, to in turn rotate the lever 63 about its hinged center, would be resisted by the spring 73, and the measure of such resistance would depend upon the compression of such spring 73. Carried by the bracket 65 is an insulation bracket 74 and a lever 75 is provided thereto as shown at 76, and an opposite end portion of such lever is received between the furcations of a furcated member 77 being held between such furcations by a member 78 passed through aligned openings in the furcations and the lever 75. This member 78 is formed of some fusible material. Likewise included between the flange 5 and the lever 75 is a coil spring 79 normally maintained in compression when the fusible member 78 has not been disturbed. Included between the lever 75 and the lever 63 is insulation means 79′, and likewise insulation means 80 is provided between the bracket 65 and the annular flange 5.

The operation of the device A as just described is as follows:

The filler plug 80′ in the cap 30 is opened and a sterilizing agent $m$ is poured within the reservoir, whereupon the filler plug is replaced. Likewise a filler plug 81 is opened so that a fluid or liquid may be poured within the casing $a$ and so that the same may surround in part the sterilizing chamber member $b$. Such liquid is designated as $o$. This liquid may be water. The heating member $f$ is conventional in form comprising an electrical heater portion 82 with suitable leads 83 connecting such portion 82 with a source of current supply, and when the current supply is allowed to flow the heating element $f$ will warm the liquid $o$. The pressure within such casing $a$ may be readily ascertained by a pressure indicator $p$ in direct communication with the interior of the casing $a$ and having a graduated dial over which a needle is adapted to play. Likewise the pressure within the sterilizing chamber $b$ may be readily ascertained by a pressure indicator $q$ likewise having a dial upon which graduations appear and over which a needle is adapted to play, all as shown in Figs. 5 and 11. A work-holding container $r$ substantially concave in appearance and closed at its ends with the body portion provided with a plurality of transverse perforations 84 is adapted to hold the instruments to be sterilized and said container is adapted to be received within the sterilizer chamber. After the instruments of whatever character are placed within the container $r$ the closure means $d$ may be revolved to the position shown in Figure 5, whereupon the container is placed within the sterilizing chamber and the closure means then placed so that the cap portion is directly in front of the entrance to such sterilizing chamber $b$, whereupon a turning of the knob 21 will seat the cap against the gasket 16 and make the container air-tight. After the liquid $o$ has reached a certain temperature and pressure as indicated by the gauge or indicator $p$, the needle valve 43 may be turned and a charge of sterilizing agent $m$ will be passed up through the ports 48 and 49 and down the port 39 through the branch ports 40 and 41 and into the sterilizing chamber. Heat from the sterilizing chamber will be communicated through the chamber walls to the sterilizing agent $m$ in the reservoir $h$. As this sterilizing agent is highly volatile pressure will be exerted upon the surface thereof to the end that when the needle valve 43 is raised sufficiently a charge will be passed through the port 48. The amount of such charge can be determined by the level of the sterilizing agent $m$ within the reservoir with respect to graduations 54. This sterilizing agent will rapidly vaporize within the sterilizing chamber and the pressure of such vaporized sterilizing agent can be readily ascertained by the gauge or indicator $q$. The sterilizing agent is preferably more volatile at a lower temperature than the liquid $o$. After the instruments within the container $r$ have been sufficiently sterilized the pressure within such sterilizing chamber may be relieved by opening the valve 59 so that gas may escape through the port 61 through the nipple 62 and a tube 85 which has its lower end within a suitable container 86 adapted to hold a liquid so that the gas does not escape directly to the atmosphere but must pass within such liquid and possibly be trapped thereby. If through inadvertence the sterilizer should boil away whatever liquid $o$ is within the same and this was unnoticed, the heat within the casing $a$ would gradually increase, and when the temperature had reached a certain predetermined degree the heat would be communicated through the flange 5 to the fusible member 78 and melt the same, and when this occurs the spring 79 would expand and revolve the lever 75 about its pivot 76, which would in turn revolve the lever 63 about its hinge point and break the contacts 68 and 70 shutting off the current supply to the heating member $f$. It will thus be seen that this acts as a safety means so that the sterilizer cannot be ruined through inadvertence in leaving the heating element turned on. Likewise a desired temperature, below the point where the fusible member would break, within the casing $a$, may be maintained by adjustment of the screw 72 which bears against the spring 73 and controls movement in part of the lever 63. For instance, if a desired pressure is required within the casing $a$, as pressure is built up the diaphragm 4 will expand outwardly and attempt to revolve the lever 63 by bearing against the member 66, and when the pressure reaches a definite point sufficient to overcome the pressure exerted by the spring 73 the electrical contact between the contact members 68 and 70 will be broken, and when the pressure is relieved the diaphragm 4 will move inwardly slightly and contact between such members 68 and 70 will again be completed.

The modification of the sterilizer shown in Fig. 11 is designated as B, and the same is similar in all details to the sterilizer illustrated by A, with one exception, and that consists in the method by which the sterilizing agent may be injected into the sterilizing chamber member $b$.

Referring to Figure 11, I have provided a tube such as a test tube 100 having suitable spaced graduations 101 thereon and which test tube is carried by means of a bracket 102 provided with clip fingers adapted to embrace the said tube. The bracket and tube are rotatably carried on a shaft 104 secured to the end 105 of the work-holding container $r$. The said shaft 104 is provided with an arm 106 and the closure means $d$ and particularly the cap 11 thereof has projecting externally thereof a knob 107 attached to a stud passed through such cap and which stud in turn carries a lever 108. The tube 100 may be filled with a sterilizing agent and when the temperature of the liquid $o$ has reached a certain degree, and the closure means has been secured to the casing $a$ so as to close entrance within the sterilizer chamber member $b$, the handle 107 may be rotated which will move the arm 108 to contact with the arm 106 and in turn tip the test tube upside down and pour the sterilizing agent within the sterilizing chamber $b$ so that the same may volatilize or gasify for application to any instruments within such chamber.

The form shown in Fig. 12 is designated by C and the same includes a test tube 109 provided with suitable graduations 110 thereon for indicating the level of any sterilizing agent within such tube and which tube is carried by means of suitable clips 111 and 112 secured to the end 105 of the work-holding container $r$, and which tube is provided with a perforation in the curved base thereof, as shown at 113 normally sealed by means 114, which means, when the temperature within the sterilizing chamber reaches a certain degree, will melt and allow the sterilizing agent within the tube to be discharged through the opening 113 and within the sterilizing chamber.

The form shown in Figure 13 is designated by D, and the same includes a reservoir 115 fitted within an annular flange 116 on the casing $a$, which reservoir includes a cap member 117 for closing the top of such reservoir. A valve housing 118 is centrally received within the reservoir and extends through such reservoir, being screw-threaded to a base member 119 at its lower extremity, and screw-threaded to a cap nut 120 at its upper extremity, which cap nut is adapted to bear against a flanged portion 121 of the cap 117. The cap nut 120 is screw-threaded for reception of a screw-threaded portion 122 of a needle valve 123 and such screw-threaded portion carries a knob 124 for rotating the needle valve. The head of such needle valve is enlarged as to diameter and provided with double conical portions as shown at 125 and 126, and the base 119 is provided with a conical seat 127 and a portion which would be the portion 10, namely, the bridging portion between the casing $a$ and the sterilizing chamber $b$ is provided with a conical seat 128 with a port 129 in direct communication with such conical seat portion and with the interior of the sterilizing chamber $b$. Thus depending upon the movement of the needle valve, the upper conical portion 126 of the needle valve will contact with the conical seat 127 of the base, or upon movement of the needle valve in a second direction the conical portion 125 will be seated upon the portion 128 and close entrance through the port 129. A small transverse port 130 is passed through the valve casing or housing 118 so as to permit any sterilizing agent within the reservoir to flow within such housing or casing. Mounted at one side of the reservoir is a pump member $t$ which includes a pump cylinder 131 within which is a plunger 132, there being a port 133 communicating with the interior of such pump cylinder and with the zone within which is received the double conical tip 125 of the needle valve. The action and operation of this particular device is as follows: The knob 124 is rotated so that the conical tip will seat on the portion 128 and close entrance through the port 129 to the interior of the sterilizing chamber $b$, whereupon the plunger 132 is moved upwardly to draw a charge of sterilizing agent within the pump cylinder. The knob 124 is then rotated in an opposite direction so that the opposite conical portion of such needle valve will seat against the conical seat 127 whereupon the plunger may be moved downwardly within the cylinder to force a charge of the sterilizing agent through the port 133 and in turn through the port 129 into the sterilizing chamber.

It will thus be seen that I have provided several methods by which the sterilizing agent may be injected in measured quantities within the sterilizing chamber member, but all of the said forms function and operate upon the same principle, namely, to permit the deliverance within the sterilizing chamber member of a measured quantity of sterilizing agent. The device in its various forms is simple of construction and very practical, does not damage instruments being sterilized and is fool-proof in its operation.

The electric heating element $f$ offers a ready solution for the heating of the liquid $o$ within the casing $a$. This method of heating is far superior to the use of an open flame such as a gas flame and the heating electrodes are readily replaced at a small cost in case they burn out.

It is obvious that various changes and modifications may be made in practicing the invention, in departure from the particular showing of the drawings, without departing from the true spirit of the invention.

Having thus disclosed my invention, I claim and desire to secure by Letters Patent:

1. Improvements in sterilizers, including a casing, a diaphragm carried by such casing, heating means within the casing, means controlled by movement of the diaphragm for controlling the temperature of the heating means, and a sterilizing chamber member within such casing.

2. Improvements in sterilizers, comprising a casing, a sterilizing chamber member spaced in part from the inner walls of such casing, a diaphragm carried by one end of such casing, and a heating element within the casing and between the inner wall surface of such casing and the outer surface of the sterilizing chamber member, such heating element being adapted to heat a fluid received within the casing and in contact with the outer surface of the sterilizing chamber member, and means in contact with the diaphragm for regulating the temperature of the heating element responsive to movement of the diaphragm due to pressure changes of the heated fluid within the casing.

3. Improvements in sterilizers, including a casing, a diaphragm carried by such casing, heating means within the casing and means controlled by movement of the diaphragm for controlling the temperature of the heating means; said heating means including an electrical heating element, and a casing carried by the first casing for confining said electrical heating element.

In testimony whereof, I have signed my name to this specification.

GEORGE M. HOLLENBACK.